United States Patent
Shindo et al.

(10) Patent No.: US 10,232,224 B2
(45) Date of Patent: Mar. 19, 2019

(54) GOLF BALL

(71) Applicant: Dunlop Sports Co. Ltd., Kobe-shi, Hyogo (JP)

(72) Inventors: Ayaka Shindo, Kobe (JP); Hiroshi Tadaoka, Kobe (JP); Chiemi Mikura, Kobe (JP); Kazuyoshi Shiga, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 9 days.

(21) Appl. No.: 15/608,684

(22) Filed: May 30, 2017

(65) Prior Publication Data

US 2017/0340924 A1    Nov. 30, 2017

(30) Foreign Application Priority Data

May 31, 2016    (JP) ................. 2016-108458

(51) Int. Cl.
| | |
|---|---|
| A63B 37/02 | (2006.01) |
| C08K 5/14 | (2006.01) |
| A63B 37/00 | (2006.01) |
| C08K 5/098 | (2006.01) |
| C08K 5/09 | (2006.01) |
| C08L 9/00 | (2006.01) |

(52) U.S. Cl.
CPC ...... *A63B 37/0031* (2013.01); *A63B 37/0051* (2013.01); *A63B 37/0063* (2013.01); *C08K 5/09* (2013.01); *C08K 5/098* (2013.01); *C08K 5/14* (2013.01); *A63B 37/0074* (2013.01); *C08L 9/00* (2013.01)

(58) Field of Classification Search
None
See application file for complete search history.

(56) References Cited

U.S. PATENT DOCUMENTS

| | | | |
|---|---|---|---|
| 5,697,856 A * | 12/1997 | Moriyama | A63B 37/0003 473/374 |
| 2004/0038751 A1* | 2/2004 | Simonutti | A63B 37/0003 473/371 |
| 2004/0110906 A1* | 6/2004 | Fujisawa | C08K 5/098 525/331.9 |
| 2006/0240911 A1* | 10/2006 | Higuchi | A63B 37/0003 473/371 |
| 2011/0105244 A1 | 5/2011 | Fushihara et al. | |
| 2011/0136588 A1* | 6/2011 | Kim | A63B 37/0003 473/373 |
| 2012/0149496 A1 | 6/2012 | Tsunashima et al. | |

FOREIGN PATENT DOCUMENTS

| | | | |
|---|---|---|---|
| JP | 05271185 | * | 10/1993 |
| JP | 2011-92565 A | | 5/2011 |
| JP | 2012-125345 A | | 7/2012 |

OTHER PUBLICATIONS

Comprehensive Varox Product Guide (2014) pp. 1-29. (Year: 2014).*
Common Chemistry webpage for CAS 6731-36-8(no date) pp. 1-3. (Year: 0000).*

* cited by examiner

*Primary Examiner* — David J Buttner
(74) *Attorney, Agent, or Firm* — Birch, Stewart, Kolasch & Birch LLP

(57) ABSTRACT

An object of the present invention is to provide a golf ball having excellent resilience performance. The present invention provides a golf ball having a spherical core and at least one cover layer, wherein the spherical core is formed from a rubber composition containing (a) a base rubber, (b) an α,β-unsaturated carboxylic acid having 3 to 8 carbon atoms and/or a metal salt thereof as a co-crosslinking agent, and (c) a crosslinking initiator, provided that the rubber composition further contains (d) a metal compound in the case of containing only (b) the α,β-unsaturated carboxylic acid having 3 to 8 carbon atoms as the co-crosslinking agent, wherein (c) the crosslinking initiator includes a peroxy ketal represented by the formula (1), and substituents represented by $R^1$ and $R^2$ have a bond dissociation energy of 435 KJ/mol or more.

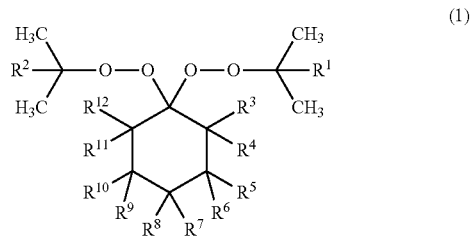

(1)

21 Claims, 1 Drawing Sheet

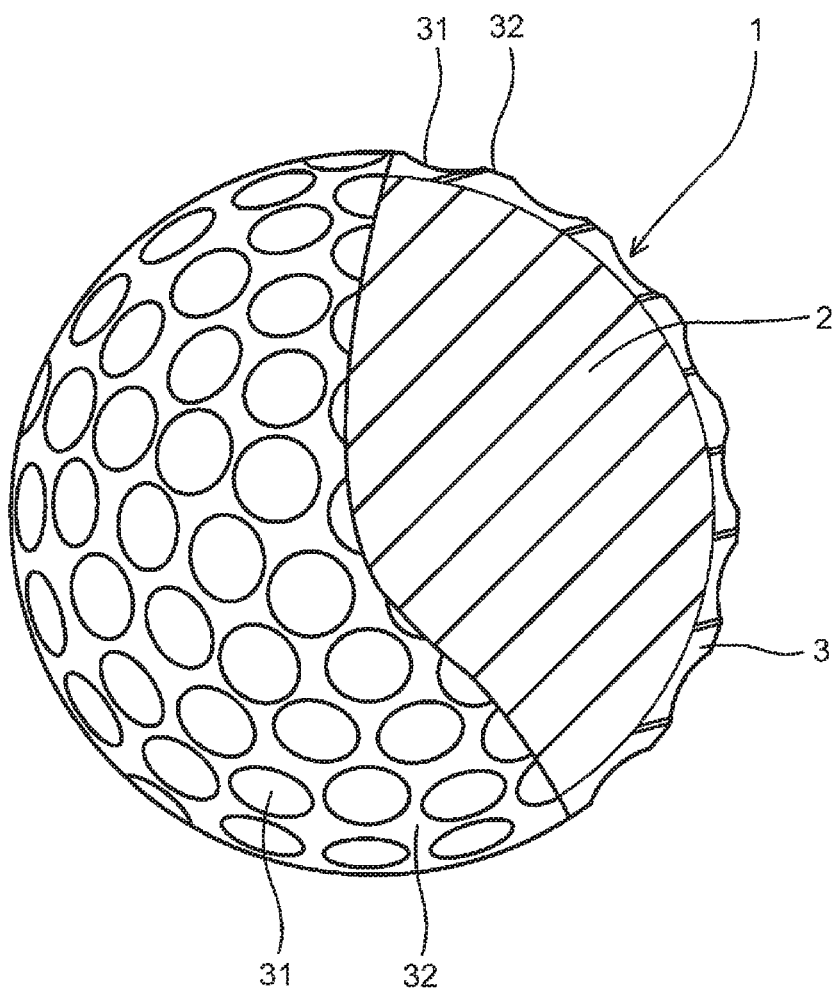

GOLF BALL

FIELD OF THE INVENTION

The present invention relates to a golf ball having excellent resilience, and specifically, relates to a technology for improving a core of a golf ball.

DESCRIPTION OF THE RELATED ART

As a method for improving flight distance on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a low spin rate travels a great distance.

For example, Japanese Patent Publication No. 2011-92565 A and Japanese Patent Publication 2012-125345 A disclose a technique for improving resilience of a core. Japanese Patent Publication No. 2011-92565 A discloses a golf ball comprising a core formed from a rubber composition containing a base rubber, a co-crosslinking agent, a crosslinking initiator and an organic sulfur compound, wherein the organic sulfur compound includes a disubstituted compound of thiophenol, disulfide and/or thiophenol metal salt with Br, F or $CF_3$ only at ortho positions (refer to Abstract, paragraph 0054 in Japanese Patent Publication No. 2011-92565 A).

In addition, Japanese Patent Publication 2012-125345 A disclose a golf ball comprising a core formed from a rubber composition containing a base rubber, a co-crosslinking agent, a crosslinking initiator and an organic sulfur compound, wherein the organic sulfur compound is a derivate of thiophenols or diphenylsulfide with a strong electron withdrawing substituent (refer to Abstract, paragraph 0052 in Japanese Patent Publication 2012-125345 A).

SUMMARY OF THE INVENTION

As disclosed in the above mentioned Japanese Patent Publication No. 2011-92565 A and Japanese Patent Publication 2012-125345 A, the technology for improving the resilience of the core by blending the organic sulfur compound in the rubber composition for forming the core, is known in the art. However, the mechanism of improving the resilience of the core by blending the organic sulfur compound is not still clear. Thus, further investigation regarding the organic sulfur compound enhancing the resilience of the core, becomes difficult. In addition, so far, the technology for improving the resilience of the core by changing the type of the crosslinking initiator blended in the rubber composition for forming the core, has not been studied.

The present invention has been made in view of the above-described situation, and an object of the present invention is to find out a crosslinking initiator improving resilience of a golf ball core, and to provide a golf ball having excellent resilience.

The present invention that has solved the above problems provides a golf ball having a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, and (c) a crosslinking initiator, provided that the rubber composition further contains (d) a metal compound in the case of containing only (b) the α,β-unsaturated carboxylic acid having 3 to 8 carbon atoms as the co-crosslinking agent, wherein (c) the crosslinking initiator includes a peroxy ketal represented by the formula (1).

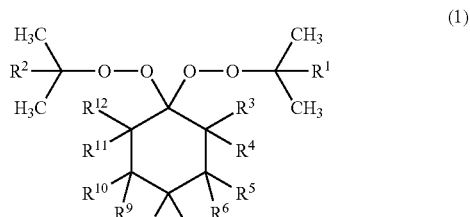

(In the formula (1), $R^1$ and $R^2$ independently represent an aryl group, an aralkyl group, an alkylaryl group, an alkoxy group, an amino group or a hydroxyl group, $R^3$ to $R^{12}$ independently represent a hydrogen atom, an alkyl group, an aryl group, an aralkyl group or an alkylaryl group, and the substituents represented by $R^1$ and $R^2$ have a bond dissociation energy of 435 KJ/mol or more.)

The peroxy ketal represented by the formula (1) has a cyclohexane ring. This initiator generates an alkyl radical (represented by the formula (1-3) which will be described later) by decomposition and β-cleavage. The obtained spherical core has further enhanced resilience by this alkyl radical. In addition, although the reaction mechanism is unclear, the obtained spherical core has improved resilience with the increment of the amount of the methyl radical generated from the initiator. Furthermore, if the substituents represented by $R^1$ and $R^2$ have a bond dissociation energy of 435 KJ/mol or more, the amount of the methyl radical generated from the peroxy ketal represented by the formula (1) increases. Accordingly, if the substituents represented by $R^1$ and $R^2$ have a bond dissociation energy of 435 KJ/mol or more, the obtained spherical core has further enhanced resilience.

According to the present invention, a golf ball having excellent resilience is obtained.

BRIEF DESCRIPTION OF THE DRAWINGS

FIG. 1 is a partially cutaway sectional view showing a golf ball according to one embodiment of the present invention;

DESCRIPTION OF THE PREFERRED EMBODIMENT

The present invention provides a golf ball having a spherical core and at least one cover layer covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, and (c) a crosslinking initiator, provided that the rubber composition further contains (d) a metal compound in the case of containing only (b) the α,β-unsaturated carboxylic acid having 3 to 8 carbon atoms as the co-crosslinking agent, wherein (c) the crosslinking initiator includes a peroxy ketal, represented by the formula (1).

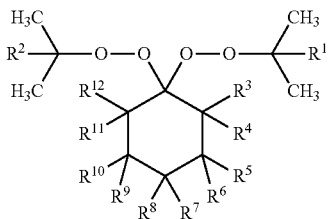

(In the formula (1), $R^1$ and $R^2$ independently represent an aryl group, an aralkyl group, an alkylaryl group, an alkoxy group, an amino group or a hydroxyl group, $R^3$ to $R^{12}$ independently represent a hydrogen atom, an alkyl group, an aryl group, an aralkyl group or an alkylaryl group, and the substituents represented by $R^1$ and $R^2$ have a bond dissociation energy of 435 KJ/mol or more.)

The peroxy ketal represented by the formula (1) generates radicals represented by the following formulae (1-1) and (1-2) by decomposition. The radical represented by the formula (1-1) has a cyclohexane ring in the molecule, and generates the alkyl radical represented by the formula (1-3) by β-cleavage. If this alkyl radical exists, the obtained spherical core has further enhanced resilience.

In addition, although the reaction mechanism is unclear, the obtained spherical core has improved resilience with the increment of the amount of the methyl radical generated from the crosslinking initiator. It is considered that this is because if the amount of the methyl radical increases, the crosslinking reaction is easily initiated by the addition with the crosslinking initiator, rather than initiated by the allyl hydrogen abstraction of the base rubber, thus the structure of the crosslinked rubber is changed. As described above, the peroxy ketal represented by the formula (1) generates the cumyloxy radical represented by the following formula (1-2) by decomposition. The cumyloxy radical generates a methyl radical or a radical of the substituent represented by $R^1$ by β-elimination. The methyl group has a bond dissociation energy of 432 KJ/mol. Thus, if the substituent represented by $R^1$ has a bond dissociation energy of 435 KJ/mol or more, the methyl radical is preferentially generated in the β-elimination. Accordingly, if the substituents represented by $R^1$ and $R^2$ have a bond dissociation energy of 435 KJ/mol or more, the amount of the methyl radical generated from the peroxy ketal represented by the formula (1) increases, the obtained spherical core has further improved resilience.

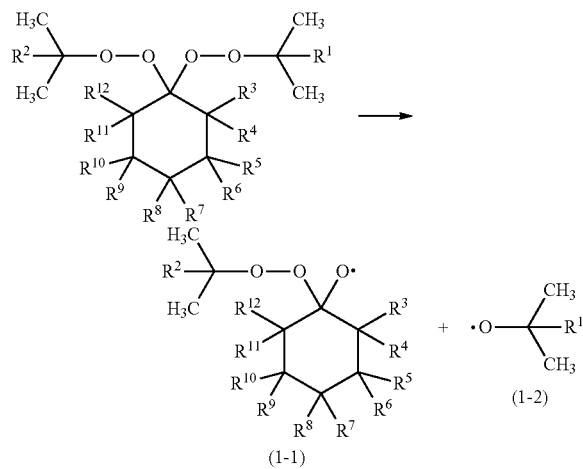

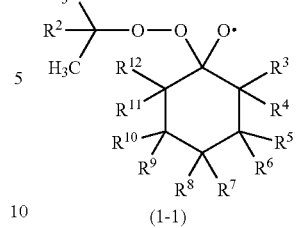

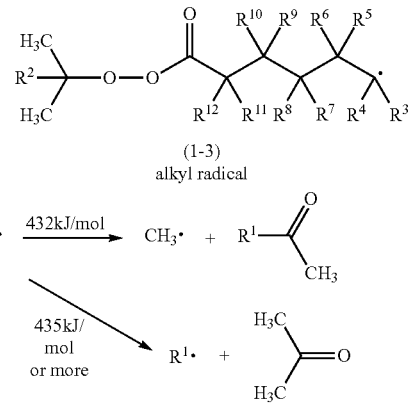

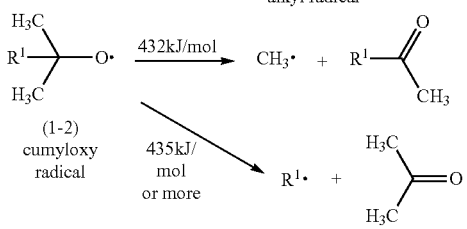

[Spherical Core]

The spherical core is formed from a core rubber composition containing (a) a base rubber, (b) a co-crosslinking agent and (c) a crosslinking initiator.

((a) Base Rubber)

As (a) the base rubber, natural rubber and/or synthetic rubber may be used. For example, polybutadiene rubber, natural rubber, polyisoprene rubber, styrene polybutadiene rubber, ethylene-propylene-diene rubber (EPDM), or the like can be used. These rubbers may be used solely, or two or more of these rubbers may be used in combination. Typically preferred of them is a high cis-polybutadiene having a cis-1,4 bond in an amount of 40 mass % or more, more preferably 80 mass % or more, even more preferably 90 mass % or more, in view of its superior resilience property. The amount of the high cis-polybutadiene in (a) the base rubber is preferably 50 mass % or more, and more preferably 70 mass % or more.

The high-cis polybutadiene preferably has a 1,2-vinyl bond in an amount of 2 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized using a rare earth element catalyst. When a neodymium catalyst, which employs a neodymium compound of a lanthanum series rare earth element compound, is used, a polybutadiene rubber having a cis-1,4 bond in a high amount and a 1,2-vinyl bond in a low amount is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300-1 (2013) using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

((b) Co-Crosslinking Agent)

(b) The co-crosslinking agent has an action of crosslinking a rubber molecule by graft polymerization to a base rubber molecular chain. As (b) the co-crosslinking agent, an α,β-unsaturated carboxylic acid having 3 to 8 carbon atoms and/or a metal salt thereof is preferred. The number of the carbon atoms of the α,β-unsaturated carboxylic acid used as (b) the co-crosslinking agent is preferably 3 to 8, more preferably 3 to 6, and even more preferably 3 or 4. The α,β-unsaturated carboxylic acid having 3 to 8 carbon atoms includes, for example, acrylic acid, methacrylic acid, fumaric acid, maleic acid, crotonic acid, and the like.

Examples of the metal constituting the metal salt of the α,β-unsaturated carboxylic acid having 3 to 8 carbon atoms include: a monovalent metal ion such as sodium, potassium, lithium or the like; a divalent metal ion such as magnesium, calcium, zinc, barium, cadmium or the like; a trivalent metal ion such as aluminum ion or the like; and other metal ion such as tin, zirconium or the like. The above metal ion may be used solely or as a mixture of at least two of them. Among these metal ions, the divalent metal ion such as magnesium, calcium, zinc, barium, cadmium or the like are preferable. Use of the divalent metal salt of the α,β-unsaturated carboxylic acid having 3 to 8 carbon atoms easily generates a metal crosslinking between the rubber molecules. Especially, as the divalent metal salt, the zinc salt of the α,β-unsaturated carboxylic acid having 3 to 8 carbon atoms is preferable, zinc acrylate is more preferable, because they enhances the resilience of the resultant golf ball. It is noted that the α,β-unsaturated carboxylic acid having 3 to 8 carbon atoms and/or the metal salt thereof may be used solely, or two or more of them may be used in combination.

The amount of (b) the co-crosslinking agent is preferably 15 parts by mass or more, more preferably 20 parts by mass or more, and is preferably 50 parts by mass or less, more preferably 45 parts by mass or less, even more preferably 40 parts by mass or less, with respect to 100 parts by mass of (a) the base rubber. If the amount of (b) the co-crosslinking agent is less than 15 parts by mass, the amount of (c) the crosslinking initiator which will be described later must be increased in order to obtain the appropriate hardness of the constituting member formed from the core rubber composition, which tends to cause the lower resilience of the golf ball. On the other hand, if the amount of (b) the co-crosslinking agent exceeds 50 parts by mass, the constituting member formed from the core rubber composition becomes excessively hard, which tends to cause the lower shot feeling of the golf ball.

((c) Crosslinking Initiator)

(c) The crosslinking initiator includes the peroxy ketal represented by the formula (1).

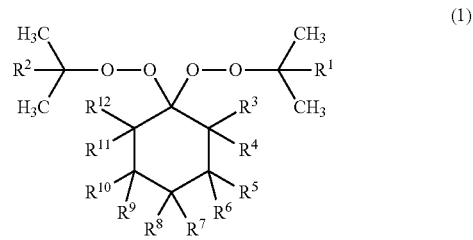

(In the formula (1), $R^1$ and $R^2$ independently represent an aryl group, an aralkyl group, an alkylaryl group, an alkoxy group, an amino group or a hydroxyl group, $R^3$ to $R^{12}$ independently represent a hydrogen atom, an alkyl group, an aryl group, an aralkyl group or an alkylaryl group, and the substituents represented by $R^1$ and $R^2$ have a bond dissociation energy of 435 KJ/mol or more.)

The bond dissociation energy is an energy needed for a compound ($R^1$—H, $R^2$—H) having a hydrogen atom bonding to the substituent represented by $R^1$ or $R^2$ to homolyze to generate a hydrogen radical and a $R^1$ radical or $R^2$ radical. For example, the energy needed for methane (a compound having a hydrogen atom bonding to a methyl group) to homolyze to generate a hydrogen radical and a methyl radical is 432 KJ/mol. In addition, the energy needed for benzene (a compound having a hydrogen atom bonding to a phenyl group) to homolyze to generate a hydrogen radical and a phenyl radical is 474 KJ/mol.

The bond dissociation energy is 435 KJ/mol or more. The bond dissociation energy is preferably 440 KJ/mol or more, more preferably 450 KJ/mol or more, and is preferably 1000 KJ/mol or less, more preferably 700 KJ/mol or less, even more preferably 600 KJ/mol or less. If the bond dissociation energy is 435 KJ/mol or more, the amount of the methyl radical generated from the crosslinking initiator increases, and if the bond dissociation energy is 1000 KJ/mol or less, little of other decomposition product is produced and thus reaction inhibition can be suppressed. It is noted that the bond dissociation energy of the substituent is described in documents (for example, Handbook of Chemistry: Basic Chemistry, revised 5th ed., edited by Chemical Society of Japan, published by Maruzen Publishing Co., Ltd).

Examples of the aryl group include a phenyl group, a naphthyl group, an anthryl group, a biphenyl group, a phenanthryl group, a fluorenyl group, and the like. Among them, the phenyl group and the naphthyl group are preferable. Examples of the aralkyl group include a benzyl group, a phenethyl group, a phenylpropyl group, a naphthylmethyl group, a naphthylethyl group, and the like. Examples of the alkylaryl group include a tolyl group, a xylyl group, a cumenyl group, a mesityl group, and the like.

Examples of the alkoxyl group include a methoxy group, an ethoxy group, a propoxy group, a butoxy group, a pentyloxy group, a hexyloxy group, a heptyloxy group, an octyloxy group, a nonyloxy group, a decyloxy group, and the like. Among them, the alkoxyl group having 1 to 6 carbon atoms is preferable, the alkoxyl group having 1 to 4 carbon atoms is more preferable.

Examples of the alkyl group include a methyl group, ethyl group, propyl group, butyl group, pentyl group, hexyl group, heptyl group, octyl group, nonyl group, decyl group, and the like. Among them, the alkyl group having 1 to 6 carbon atoms is preferable, the alkyl group having 1 to 4 carbon atoms is more preferable.

As the substituents represented by $R^1$ and $R^2$, a phenyl group (474 KJ/mol), a naphthyl group (450 KJ/mol or more), an amino group (444 KJ/mol), a hydroxyl group (492 KJ/mol) and a methoxy group (435 KJ/mol) are preferable, the phenyl group and the naphthyl group are more preferable. It is noted that data described in the parentheses after the names of the substituent indicate the bond dissociation energy of each substituent.

As the peroxy ketal represented by the formula (1), the compounds represented by the following formulae (2) to (6) are preferable.

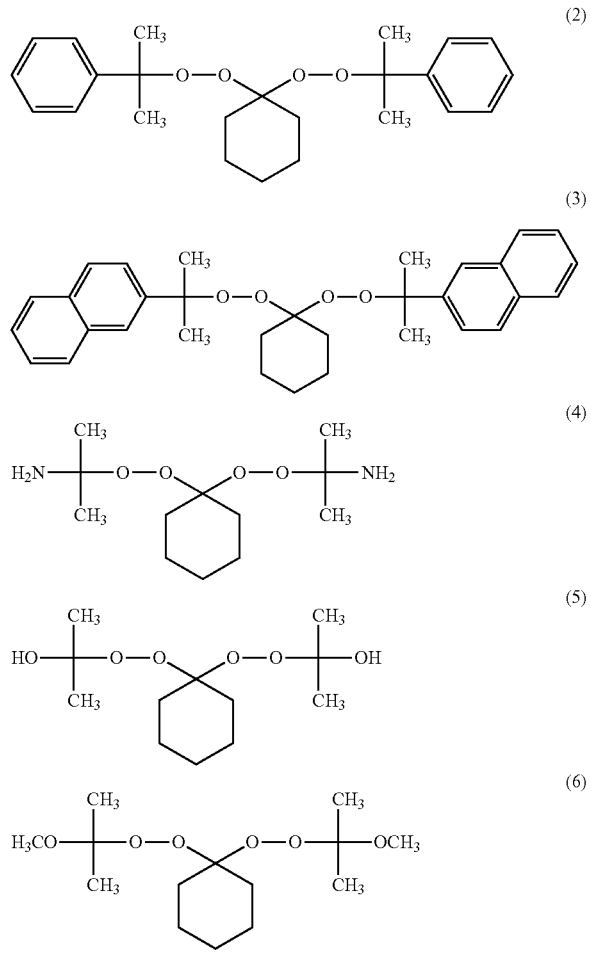

(c) The crosslinking initiator may further include other crosslinking initiator than the peroxy ketal represented by the formula (1). Examples of the other crosslinking initiator include an organic peroxide such as dicumyl peroxide, 1,1-bis(t-butylperoxy)-3,3,5-trimethylcyclohexane, 2,5-dimethyl-2,5-di(t-butylperoxy)hexane, di-t-butyl peroxide. These organic peroxides may be used solely, or two or more of these organic peroxides may be used in combination. It is noted that the amount of the peroxy ketal represented by the formula (1) in (c) the crosslinking initiator is preferably 50 mass % or more, more preferably 60 mass % or more, and even more preferably 70 mass % or more. It is also preferred that (c) the crosslinking initiator consists of the peroxy ketal represented by the formula (1).

The amount of (c) the crosslinking initiator is preferably 0.01 part by mass or more, more preferably 0.05 part by mass or more, and is preferably 10 parts by mass or less, more preferably 5 parts by mass or less, with respect to 100 parts by mass of (a) the base rubber. If the amount of (c) the crosslinking initiator is less than 0.01 part by mass, the constituting member formed from the core rubber composition becomes so soft that the golf ball may have the lower resilience. If the amount of (c) the crosslinking initiator exceeds 10 parts by mass, the amount of (b) the co-crosslinking agent which has been described above must be decreased in order to obtain the appropriate hardness of the constituting member formed from the core rubber composition, resulting in the insufficient resilience or worse durability of the golf ball.

As the co-crosslinking agent, the metal salt of the α,β-unsaturated carboxylic acid having 3 to 8 carbon atoms is preferably used. In the case that the α,β-unsaturated carboxylic acid having 3 to 8 carbon atoms is used as the co-crosslinking agent, (d) a metal compound is preferably used in combination.

((d) Metal Compound)

(d) The metal compound is not particularly limited, as long as it can neutralize (b) the α,β-unsaturated carboxylic acid having 3 to 8 carbon atoms in the rubber composition. Examples of (d) the metal compound include a metal hydroxide such as magnesium hydroxide, zinc hydroxide, calcium hydroxide, sodium hydroxide, lithium hydroxide, potassium hydroxide, copper hydroxide, and the like; a metal oxide such as magnesium oxide, calcium oxide, zinc oxide, copper oxide, and the like; a metal carbonate such as magnesium carbonate, zinc carbonate, calcium carbonate, sodium carbonate, lithium carbonate, potassium carbonate, and the like. (d) The metal compound preferably includes the divalent metal compound, more preferably includes the zinc compound. This is because the divalent metal compound reacts with the α,β-unsaturated carboxylic acid having 3 to 8 carbon atoms, thereby forming a metal crosslinking. In addition, use of the zinc compound provides a golf ball with high resilience. (d) These metal compounds may be used solely or as a mixture of at least two of them.

((e) Organic Sulfur Compound)

Examples of (e) the organic sulfur compound include thiophenols, thionaphthols, polysulfides, thiurams, thiocarboxylic acids, dithiocarboxylic acids, sulfenamides, dithiocarbamates, thiazoles, and the like. From the aspect of the larger hardness distribution of the spherical core, (e) the organic sulfur compound preferably includes the organic sulfur compound having a thiol group (—SH) or the metal salt thereof, more preferably includes thiophenols, thionaphthols, or metal salts thereof.

Examples of the thiols include thiophenols and thionaphthols. Examples of the thiophenols include thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol, pentafluorothiophenol, and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol, and the like;

thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol, pentabromothiophenol, and the like; thiophenols substituted with a iodo group, such as 4-iodothiophenol, 2,5-diiodothiophenol, 2,6-diiodothiophenol, 2,4,5-triiodothiophenol, 2,4,5,6-tetraiodothiophenol, pentaiodothiophenol, and the like; and metal salts thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and their metal salts. Among them, 2-thionaphthol, 1-thionaphthol, and their metal salts are preferred. As the metal salt, a divalent metal salt is preferred, and a zinc salt is more preferred. Specific examples of the metal salt include zinc salt of 1-thionaphthol and zinc salt of 2-thionaphthol.

The polysulfides are organic sulfur compounds having a polysulfide bond, and examples thereof include disulfides, trisulfides and tetrasulfides. As the polysulfides, diphenylpolysulfides are preferred.

Examples of the diphenylpolysulfides include diphenyl disulfide; diphenyl disulfides substituted with a halogen group, such as bis(4-fluorophenyl) disulfide, bis(2,5-difluorophenyl) disulfide, bis(2,6-difluorophenyl) disulfide, bis(2,4,5-trifluorophenyl) disulfide, bis(2,4,5,6-tetrafluorophenyl) disulfide, bis(pentafluorophenyl) disulfide, bis(4-chlorophenyl) disulfide, bis(2,5-dichlorophenyl) disulfide, bis(2,6-dichlorophenyl) disulfide, bis(2,4,5-trichlorophenyl) disulfide, bis(2,4,5,6-tetrachlorophenyl) disulfide, bis(pentachlorophenyl) disulfide, bis(4-bromophenyl) disulfide, bis(2,5-dibromophenyl) disulfide, bis(2,6-dibromophenyl) disulfide, bis(2,4,5-tribromophenyl) disulfide, bis(2,4,5,6-tetrabromophenyl) disulfide, bis(pentabromophenyl) disulfide, bis(4-iodophenyl) disulfide, bis(2,5-diiodophenyl) disulfide, bis(2,6-diiodophenyl) disulfide, bis(2,4,5-triiodophenyl) disulfide, bis(2,4,5,6-tetraiodophenyl) disulfide, bis(pentaiodophenyl) disulfide; diphenyl disulfides substituted with an alkyl group, such as bis(4-methylphenyl) disulfide, bis(2,4,5-trimethylphenyl) disulfide, bis(pentamethylphenyl) disulfide, bis(4-t-butylphenyl) disulfide, bis(2,4,5-tri-t-butylphenyl) disulfide, bis(penta-t-butylphenyl) disulfide; and the like.

Examples of the thiurams include thiuram monosulfides such as tetramethylthiuram monosulfide and the like; thiuram disulfides such as tetramethylthiuram disulfide, tetraethylthiuram disulfide, tetrabutylthiuram disulfide and the like; and thiuram tetrasulfides such as dipentamethylene thiuram tetrasulfide and the like. Examples of the thiocarboxylic acids include naphthalene thiocarboxylic acid. Examples of the dithiocarboxylic acids include naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

(e) The organic sulfur compound may be used solely or as a mixture of at least two of them. As (e) the organic sulfur compound, the thiophenols and/or the metal salts thereof, the thionaphthols and/or the metal salt thereof, the diphenyl disulfides, and the thiuram disulfides are preferred, 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl) disulfide, bis(2,6-dichlorophenyl) disulfide, bis(2,6-dibromophenyl) disulfide, bis(2,6-diiodophenyl) disulfide, bis(pentabromophenyl) disulfide are more preferred.

The amount of (e) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained and thus the resilience of the golf ball may not be enhanced. In addition, if the amount of (e) the organic sulfur compound exceeds 5.0 parts by mass, the compression deformation amount of the obtained golf ball becomes large and thus the resilience may be lowered.

((f) Carboxylic Acid and/or Salt Thereof)

The core rubber composition may further contain (f) a carboxylic acid and/or a salt thereof. If (f) the carboxylic acid and/or the salt thereof is contained, the obtained spherical core has a higher degree of an outer-hard and inner soft structure. Examples of (f) the carboxylic acid and/or the salt thereof include an aliphatic carboxylic acid, a salt of an aliphatic carboxylic acid, an aromatic carboxylic acid, and a salt of an aromatic carboxylic acid. (f) The carboxylic acid and/or the salt may be used solely or as a mixture of at least two of them.

The aliphatic carboxylic acid may be either a saturated aliphatic carboxylic acid (hereinafter sometimes referred to as "saturated fatty acid") or an unsaturated aliphatic carboxylic acid (hereinafter sometimes referred to as "unsaturated fatty acid"). In addition, the aliphatic carboxylic acid may have a branched structure or cyclic structure. The number of the carbon atoms of the saturated fatty acid is preferably 1 or more, and is preferably 30 or less, more preferably 18 or less, even more preferably 13 or less. The number of the carbon atoms of the unsaturated fatty acid is preferably 5 or more, more preferably 7 or more, even more preferably 8 or more, and is preferably 30 or less, more preferably 18 or less, even more preferably 13 or less. It is noted that (f) the carboxylic acid and/or the salt thereof excludes the α,β-unsaturated carboxylic acid having 3 to 8 carbon atoms and/or the metal salt thereof used as (b) the co-crosslinking agent.

Examples of the aromatic carboxylic acid include a carboxylic acid having a benzene ring in the molecule, and a carboxylic acid having a heteroaromatic ring in the molecule. The aromatic carboxylic acid may be used solely or as a mixture of at least two of them. Examples of the carboxylic acid having the benzene ring include an aromatic carboxylic acid having a carboxyl group directly bonding to a benzene ring, an aromatic-aliphatic carboxylic acid having an aliphatic carboxylic acid bonding to a benzene ring, a polynuclear aromatic carboxylic acid having a carboxyl group directly bonding to a fused benzene ring, a polynuclear aromatic-aliphatic carboxylic acid having an aliphatic carboxylic acid bonding to a fused benzene ring, and the like. Examples of the carboxylic acid having the heteroaromatic ring include a carboxylic acid having a carboxyl group directly bonding to a heteroaromatic ring.

As the aliphatic carboxylic acid salt or aromatic carboxylic acid salt, a salt of the above aliphatic carboxylic acid or aromatic carboxylic acid may be used. Examples of the cation component of these salts include a metal ion, ammonium ion, and organic cation. Examples of the metal ion include a monovalent metal ion such as sodium, potassium, lithium, silver and the like; a divalent metal ion such as magnesium, calcium, zinc, barium, cadmium, copper, cobalt, nickel, manganese and the like; a trivalent metal ion such as aluminum, iron and the like; and other metal ion such as tin, zirconium, titanium and the like. The cation component may be used solely or as a mixture of at least two of them.

The organic cation is a cation having a carbon chain. The organic cation includes, for example, without particular limitation, an organic ammonium ion. Examples of the organic ammonium ion include a primary ammonium ion such as stearyl ammonium ion, hexyl ammonium ion, octyl ammonium ion, 2-ethylhexyl ammonium ion, and the like; a secondary ammonium ion such as dodecyl(lauryl) ammonium ion, octadecyl(stearyl) ammonium ion, and the like; a tertiary ammonium ion such as trioctyl ammonium ion, and the like; and a quaternary ammonium ion such as dioctyldimethyl ammonium ion, distearyldimethyl ammonium ion, and the like. The organic cation may be used solely or as a mixture of two or more of them.

Examples of the aliphatic carboxylic acid and/or the salt thereof include a saturated fatty acid and/or a salt thereof, and an unsaturated fatty acid and/or a salt thereof. The saturated fatty acid and/or the salt thereof is preferred, caprylic acid (octanoic acid), pelargonic acid (nonanoic acid), capric acid (decanoic acid), lauric acid, myristic acid, palmitic acid, stearic acid, behenic acid, and their potassium salt, magnesium salt, calcium salt, aluminum salt, zinc salt, iron salt, copper salt, nickel salt, cobalt salt are more preferred. As the unsaturated fatty acid and/or the salt thereof, palmitoleic acid, oleic acid, linoleic acid, arachidic acid, and their potassium salt, magnesium salt, calcium salt, aluminum salt, zinc salt, iron salt, copper salt, nickel salt, cobalt salt are preferred.

As the aromatic carboxylic acid and/or the salt thereof, benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, thenoic acid, and their potassium salt, magnesium salt, calcium salt, aluminum salt, zinc salt, iron salt, copper salt, nickel salt, cobalt salt are particularly preferred.

The amount of (f) the carboxylic acid and/or the salt thereof, for example, is preferably 0.5 part by mass or more, more preferably 1.0 part by mass or more, even more preferably 1.5 parts by mass or more, and is preferably 40 parts by mass or less, more preferably 35 parts by mass or less, even more preferably 30 parts by mass or less, with respect to 100 parts by mass of (a) the base rubber. If the amount of (f) the carboxylic acid and/or the salt thereof is 0.5 part by mass or more, the spherical core has a higher degree of an outer-hard and inner soft structure, and if the amount of (f) the carboxylic acid and/or the salt thereof is 40 parts by mass or less, lowering in the core hardness is suppressed and the resilience is better.

It is noted that there are cases where the surface of the compound used as the co-crosslinking agent is treated with stearic acid and/or a zinc salt thereof to improve the dispersibility to the rubber. In the case of using the co-crosslinking agent whose surface is treated with stearic acid and/or the zinc salt thereof, in the present invention, the amount of stearic acid and/or the zinc salt thereof used as a surface treating agent is included in the amount of (f) the carboxylic acid and/or the salt thereof. For example, if 25 parts by mass of zinc acrylate whose surface treatment amount with zinc stearate is 10 mass % is used, the amount of zinc stearate is 2.5 parts by mass, and the amount of zinc acrylate is 22.5 parts by mass. Thus, 2.5 parts by mass is counted as the amount of (f) the carboxylic acid and/or the salt thereof.

The rubber composition used in the present invention may further contain additives such as a pigment, a filler for adjusting weight or the like, an antioxidant, a peptizing agent, and a softener, where necessary. Further, the core rubber composition may further contain a rubber powder obtained by pulverizing a golf ball core or offcuts produced when preparing a core.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. The amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the amount of the blue pigment is less than 0.001 part by mass, blueness is insufficient, and the color looks yellowish. If the amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as a final product. The filler may be blended where necessary. The filler includes, for example, an inorganic filler such as zinc oxide, barium sulfate, calcium carbonate, magnesium oxide, tungsten powder, molybdenum powder, and the like. As the filler, zinc oxide is particularly preferred. It is considered that zinc oxide functions as a vulcanization aid to increase the hardness of the whole spherical core. The amount of the filler is preferably 0.5 part by mass or more, more preferably 1 part by mass or more, and is preferably 30 parts by mass or less, more preferably 25 parts by mass or less, even more preferably 20 parts by mass or less. If the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the antioxidant is preferably 0.1 part by mass or more and 1 part by mass or less, with respect to 100 parts by mass of (a) the base rubber. In addition, the amount of the peptizing agent is preferably 0.1 part by mass or more and 5 parts by mass or less, with respect to 100 parts by mass of (a) the base rubber.

The rubber composition used in the present invention may be obtained by kneading (a) the base rubber, (b) the α,β-unsaturated carboxylic acid having 3 to 8 carbon atoms and/or the metal salt thereof, (c) the crosslinking initiator, and other additives where necessary. The kneading may be conducted, without any limitation, with a publicly known kneading machine such as a kneading roll, a banbury mixer, a kneader, or the like.

The spherical core of the golf ball according to the present invention may be obtained by molding the kneaded rubber composition in a mold. The temperature for molding the spherical core is preferably 100° C. or more, more preferably 110° C. or more, even more preferably 120° C. or more, and is preferably 170° C. or less. If the molding temperature exceeds 170° C., the surface hardness of the core tends to decrease. In addition, the molding pressure preferably ranges from 2.9 MPa to 11.8 MPa. The molding time preferably ranges from 10 minutes to 60 minutes.

The hardness difference (Hs−Ho) between the surface hardness Hs and the center hardness Ho of the spherical core is preferably 0 or more, more preferably 10 or more, even more preferably 15 or more, particularly preferably 17 or more, and is preferably 60 or less, more preferably 55 or less, even more preferably 50 or less in Shore C hardness. If the hardness difference (Hs−Ho) is large, the golf ball travelling a greater flight distance due to the high launch angle and low spin rate is obtained.

The center hardness Ho of the spherical core is preferably 30 or more, more preferably 35 or more, and even more preferably 40 or more in Shore C hardness. If the center hardness Ho of the spherical core is 30 or more in Shore C hardness, the spherical core does not become excessively soft and thus the resilience thereof is better. In addition, the center hardness Ho of the spherical core is preferably 70 or less, more preferably 65 or less, and even more preferably 60 or less in Shore C hardness. If the center hardness Ho of the spherical core is 70 or less in Shore C hardness, the spherical core does not become excessively hard and thus the shot feeling thereof is better.

The surface hardness Hs of the spherical core is preferably 65 or more, more preferably 70 or more, even more preferably 72 or more, and is preferably 100 or less, more preferably 95 or less, even more preferably 90 or less in Shore C hardness. If the surface hardness Hs of the spherical core is 65 or more in Shore C hardness, the spherical core does not become excessively soft and thus the resilience thereof is better. In addition, if the surface hardness Hs of the spherical core is 100 or less in Shore C hardness, the spherical core does not become excessively hard and thus the shot feeling thereof is better.

The diameter of the spherical core is preferably 34.8 mm or more, more preferably 36.8 mm or more, even more preferably 38.8 mm or more, and is preferably 42.2 mm or less, more preferably 41.8 mm or less, even more preferably 41.2 mm or less, most preferably 40.8 mm or less. If the diameter of the spherical core is 34.8 mm or more, the thickness of the cover does not become too thick and thus the resilience is better. On the other hand, if the diameter of the spherical core is 42.2 mm or less, the thickness of the cover does not become too thin and thus the cover functions well.

When the spherical core has a diameter in a range from 34.8 mm to 42.2 mm, the compression deformation amount of the spherical core (shrinking deformation amount of the spherical core along the compression direction) when a load from an initial load of 98 N to a final load of 1275 N is applied to the spherical core, is preferably 2.0 mm or more, more preferably 2.8 mm or more, and is preferably 6.0 mm or less, more preferably 5.0 mm or less. If the compression deformation amount is 2.0 mm or more, the shot feeling of the golf ball is better. If the compression deformation amount is 6.0 mm or less, the resilience of the golf ball is better.

[Cover]

The cover of the golf ball is formed from a cover composition comprising a resin component. Examples of the resin component include an ionomer resin; a thermoplastic polyurethane elastomer having a trade name of "Elastollan (e.g. "Elastollan XNY85A")" available from BASF Japan Ltd; a thermoplastic polyamide elastomer having a trade name of "Pebax (e.g. "Pebax 2533")" available from Arkema K. K.; a thermoplastic polyester elastomer having a trade name of "Hytrel" available from Du Pont-Toray Co., Ltd.; and a thermoplastic styrene elastomer having a trade name of "Rabalon" available from Mitsubishi Chemical Corporation; and the like.

The ionomer resin includes a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms, and an α,β-unsaturated carboxylic acid ester with a metal ion; or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Among them, the ionomer resin preferably includes a metal ion-neutralized product of a binary copolymer composed of ethylene-(meth)acrylic acid, and a metal ion-neutralized product of a ternary copolymer composed of ethylene, (meth)acrylic acid, and (meth)acrylic acid ester.

Specific examples of the ionomer resin include trade name "Himilan (registered trademark) (e.g. the binary copolymerized ionomer such as 1555 (Na), 1557 (Zn), 1605 (Na), 1706 (Zn), 1707 (Na), AM7311 (Mg) and the like; and the ternary copolymerized ionomer such as 1856 (Na), 1855 (Zn) and the like)" available from Du Pont-Mitsui Polychemicals Co., Ltd.

Specific examples of the ionomer resin further include "Surlyn (registered trademark) (e.g. the binary copolymerized ionomer such as 8945 (Na), 9945 (Zn), 8140 (Na), 8150 (Na), 9120 (Zn), 9150 (Zn), 6910 (Mg), 6120 (Mg), 7930 (Li), 7940 (Li), AD8546 (Li) and the like; and the ternary copolymerized ionomer such as 8120 (Na), 8320 (Na), 9320 (Zn), 6320 (Mg), HPF 1000 (Mg), HPF 2000 (Mg) and the like)" available from E.I. du Pont de Nemours and Company.

In addition, specific examples of the ionomer resin also include "Iotek (registered trademark) (e.g. the binary copolymerized ionomer such as 8000 (Na), 8030 (Na), 7010 (Zn), 7030 (Zn) and the like; and the ternary copolymerized ionomer such as 7510 (Zn), 7520 (Zn) and the like)" available from ExxonMobil Chemical Corporation.

It is noted that Na, Zn, Li, and Mg described in the parentheses after the trade names of the ionomer resins indicate metal types of neutralizing metal ions for the ionomer resins. The ionomer resin may be used solely or as a mixture of two or more of them.

The cover composition constituting the cover of the golf ball according to the present invention preferably contains, as a resin component, a thermoplastic polyurethane elastomer or an ionomer rein. In the case of using the ionomer rein, it is also preferred to use a thermoplastic styrene elastomer together. The amount of the polyurethane or ionomer resin in the resin component of the cover composition is preferably 50 mass % or more, more preferably 60 mass % or more, and even more preferably 70 mass % or more.

In addition to the above mentioned resin component, the cover composition may further contain a pigment component such as a white pigment (e.g. titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or fluorescent brightener; and the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment is more than 10 parts by mass, the durability of the resultant cover may deteriorate.

The slab hardness of the cover composition is preferably set in accordance with the desired performance of the golf ball. For example, in case of a so-called distance golf ball which focuses on a flight distance, the cover composition preferably has a slab hardness of 50 or more, more preferably 55 or more, and preferably has a slab hardness of 80 or less, more preferably 70 or less in Shore D hardness. If the cover composition has a slab hardness of 50 or more, the obtained golf ball has a higher launch angle and lower spin rate on driver shots and iron shots, and thus travels a greater flight distance. In addition, if the cover composition has a slab hardness of 80 or less, the golf ball excellent in durability is obtained. Further, in case of a so-called spin golf ball which focuses on controllability, the cover composition preferably has a slab hardness of less than 50, and preferably has a slab hardness of 20 or more, more preferably 25 or more in Shore D hardness. If the cover composition has a slab hardness of less than 50 in Shore D hardness, the obtained golf ball travels a great flight distance on driver shots due to the core of the present invention, and readily stops on the green due to the high spin rate on approach shots as well. If the cover composition has a slab hardness of 20 or more, the abrasion resistance is enhanced. In case of a plurality of cover layers, the slab hardness of the cover composition constituting each layer may be identical to or different from each other, as long as the slab hardness of each layer falls within the above range.

Examples of the method for molding the cover of the golf ball according to the present invention include a method which comprises molding the cover composition into a hollow shell, covering the core with a plurality of the hollow shells, and subjecting the core with a plurality of the hollow shells to the compression molding (preferably a method which comprises molding the cover composition into a half hollow shell, covering the core with two of the half hollow shells, and subjecting the core with two of the half hollow shells to the compression molding); and a method which comprises injection molding the cover composition directly onto the core.

When molding the cover by the compression molding method, the molding of the half shell may be performed by either the compression molding method or the injection molding method, and the compression molding method is preferred. The compression molding of the cover composition into the half shell may be carried out, for example, under a molding pressure of 1 MPa or more and 20 MPa or less at a molding temperature of −20° C. or more and 70° C. or less relative to the flow beginning temperature of the cover composition. By performing the molding under the above conditions, the half shell having a uniform thickness can be formed. Examples of the method for molding the cover using the half shells include a method which comprises covering the core with two of the half shells and subjecting the core with two of the half shells to the compression molding. The compression molding of the half shells into the cover may be carried out, for example, under a molding pressure of 0.5 MPa or more and 25 MPa or less at a molding temperature of −20° C. or more and 70° C. or less relative to the flow beginning temperature of the cover composition. By performing the molding under the above conditions, a golf ball cover having a uniform thickness can be formed.

In the case of injection molding the cover composition into the cover, the cover composition extruded in the pellet form may be used for the injection molding, or the cover materials such as the base resin components, pigment and so on may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, the core is charged and held with the protruding hold pin, and the cover composition is charged and then cooled to form the cover. For example, the cover composition heated to 200° C. to 250° C. is charged for 0.5 to 5 seconds, into a mold held under the pressure of 9 MPa to 15 MPa, and the mold is opened after cooled for 10 to 60 seconds to obtain the cover.

The concave portions called "dimple" are usually formed on the surface of the cover. The total number of the dimples is preferably 200 or more and 500 or less. If the total number of the dimples is less than 200, the dimple effect is hardly obtained. On the other hand, if the total number of the dimples exceeds 500, the dimple effect is hardly obtained because the size of the respective dimples is small. The shape (shape in a plan view) of the dimples includes, for example, without any limitation, a circle, a polygonal shape such as a roughly triangular shape, a roughly quadrangular shape, a roughly pentagonal shape, a roughly hexagonal shape and the like, and other irregular shape. The shape of the dimples may be employed solely, or at least two of them may be used in combination.

The cover preferably has a thickness of 4.0 mm or less, more preferably 3.0 mm or less, and even more preferably 2.0 mm or less. If the thickness of the cover is 4.0 mm or less, the resilience and shot feeling of the obtained golf ball are better. The cover of the golf ball preferably has a thickness of 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. If the cover has a plurality of layers, it is preferred that the total thickness of the cover layers falls within the above range.

The golf ball body having the cover molded thereon is ejected from the mold, and as necessary, is preferably subjected to surface treatments such as deburring, cleaning, and sandblast. If desired, a paint film or a mark may be formed thereon. The paint film preferably has a thickness of, but not limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film is more than 50 μm, the effect of the dimples is reduced, resulting in lowering flying performance of the golf ball.

The golf ball according to the present invention preferably has a diameter ranging from 40 mm to 45 mm. In light of satisfying a regulation of US Golf Association (USGA), the diameter is particularly preferably 42.67 mm or more. In light of prevention of the air resistance, the diameter is more preferably 44 mm or less, particularly preferably 42.80 mm or less. In addition, the golf ball preferably has a mass of 40 g or more and 50 g or less. In light of obtaining greater inertia, the golf ball more preferably has a mass of 44 g or more, particularly preferably 45.00 g or more. In light of satisfying a regulation of USGA, the golf ball particularly preferably has a mass of 45.93 g or less.

When the golf ball according to the present invention has a diameter ranging from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.4 mm or more, even more preferably 2.5 mm or more, most preferably 2.8 mm or more, and is preferably 4.0 mm or less, more preferably 3.8 mm or less, even more preferably 3.6 mm or less. If the compression deformation amount is 2.0 mm or more, the golf ball does not become excessively hard and thus the shot feeling thereof becomes better. On the other hand, if the compression deformation amount is 4.0 mm or less, the resilience of the golf ball becomes better.

The construction of the golf ball according to the present invention is not particularly limited, as long as the golf ball comprises a spherical core and at least one cover layer covering the spherical core. The spherical core preferably has a single layered construction. This is because unlike a spherical core having a multi-layered construction, the spherical core having the single layered construction does not have an energy loss at the interface of the multi-layered construction when hitting, and thus has enhanced resilience. In addition, the cover has a construction composed of at least one layer, for example, a single layered construction, or a multi-layered construction composed of at least two layers. The golf ball according to the present invention includes, for example, a two-piece golf ball composed of a spherical core and a single layered cover disposed around the spherical core; a multi-piece golf ball composed of a spherical core, and at least two cover layers disposed around the spherical core (including a three-piece golf ball); and a wound golf ball composed of a spherical core, a rubber thread layer disposed around the spherical core, and a cover disposed around the rubber thread layer. The present invention can be suitably applied to any one of the above golf balls.

FIG. 1 is a partially cutaway sectional view showing a golf ball 1 according to one embodiment of the present invention. The golf ball 1 comprises a spherical core 2, and a cover 3 covering the spherical core 2. A plurality of dimples 31 are formed on a surface of the cover 3. Other portions than the dimples 31 on the surface of the golf ball 1 are lands 32. The golf ball 1 is also provided with a paint layer and a mark layer outside the cover 3, but these layers are not depicted.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]

(1) Compression Deformation Amount (mm)

The deformation amount of the core or golf ball along the compression direction (shrinking amount of the core or golf ball along the compression direction), when applying a load from 98 N as an initial load to 1275 N as a final load to the core or golf ball, was measured.

(2) Coefficient of Restitution

A metal cylindrical object with a mass of 198.4 g was allowed to collide with each core or golf ball at a speed of 40 m/sec, and the speeds of the cylindrical object and the core or golf ball before and after the collision were measured. Based on these speeds and the mass of each object, the coefficient of restitution for each core or golf ball was calculated. The measurement was conducted by using twelve samples for each core or golf ball, and the average value was regarded as the coefficient of restitution for the core or golf ball. It is noted that, in Table 1, the coefficient of restitution is shown as the difference from that of the golf ball No. 2.

(3) Core Hardness (Shore C Hardness)

The hardness measured at the surface of the core was adopted as the surface hardness of the core. In addition, the core was cut into two hemispheres to obtain a cut plane, and the hardness was measured at the central point of the cut plane, and at predetermined distances from the central point of the cut plane. It is noted that the hardness was measured at 4 points at predetermined distances from the central point of the cut plane, and the average value thereof was adopted as the core hardness at predetermined distances from the central point. The hardness was measured with an automatic hardness tester (Digitest II, available from Bareiss company) using a detector of "Shore C".

(4) Slab Hardness (Shore D Hardness)

Sheets with a thickness of about 2 mm were produced by injection molding the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a detector of "Shore D".

[Production of Golf Ball]

(1) Production of Core

The rubber compositions having the formulations shown in Table 1 were kneaded with a kneading roll, and heat-pressed in upper and lower molds, each having a hemispherical cavity, to obtain spherical cores having a diameter of 39.8 mm. It is noted that the amount of (c) the crosslinking initiator was adjusted such that the active oxygen amount thereof was equal to the active oxygen amount of 0.8 part by mass of dicumyl peroxide in the golf ball No. 2. In addition, the molding temperature of the spherical core was set at −15° C. relative to the one-minute half-life temperature of the crosslinking initiator. It is noted that the one-minute half-life temperatures of DCP and Perhexa C-40 were the values described in the catalogue, and the one-minute half-life temperature of Luperox 931XL was estimated by the differential scanning calorimetry (DSC) measurement. Specifically, for the mixture composed of 100 parts by mass of the base rubber (BR730) and 1.58 parts by mass of the crosslinking initiator (Luperox 931XL), the DSC measurement (measuring temperature range: from 0° C. to 200° C., temperature rising rate: 10° C./min) was carried out, and the temperature (145° C.) of −14° C. relative to the exothermic peak temperature (159° C.) was assumed as the one-minute half-life temperature. It is noted that the mixture composed of 100 parts by mass of the base rubber (BR730) and 0.8 part by mass of the crosslinking initiator (DCP, one-minute half-life temperature: 175° C.) had an exothermic peak temperature of 189° C., and the mixture composed of 100 parts by mass of the base rubber (BR730) and 0.95 part by mass of the crosslinking initiator (Perhexa C-40, one-minute half-life temperature: 154° C.) had an exothermic peak temperature of 168° C.

TABLE 2

| Cover composition | | |
|---|---|---|
| Formulation (parts by mass) | Himilan 1605 | 50 |
| | Himilan 1706 | 50 |
| | Titanium oxide | 4 |
| Slab hardness (Shore D) | | 65 |

Himilan (registered trademark) 1605: sodium ion neutralized ethylene-methacrylic acid copolymer ionomer resin available from Du Pont-Mitsui Polychemicals Co., Ltd.
Himilan 1706: zinc ion neutralized ethylene-methacrylic acid copolymer ionomer resin available from Du Pont-Mitsui Polychemicals Co., Ltd.

The golf ball No. 1 is the case that the core rubber composition contains Luperox 931XL (1,1-di(1-methyl-1-phenylethylperoxy)cyclohexane) as the crosslinking initiator. The golf ball No. 1 shows better resilience performance than the golf ball No. 2 which uses dicumyl peroxide as the crosslinking initiator. Compared to this, the case using 1,1-di(t-butylperoxy)cyclohexane as the crosslinking initiator (No. 3) and the case using dicumyl peroxide and 1,1-di(t-butylperoxy)cyclohexane in combination as the crosslinking initiator (No. 4) don't show better resilience performance than the golf ball No. 2.

TABLE 1

| | | | Golf ball No. | | | |
|---|---|---|---|---|---|---|
| | | | 1 | 2 | 3 | 4 |
| Core | Formulation (parts by mass) | BR730 | 100 | 100 | 100 | 100 |
| | | ZN-DA90S | 31 | 29 | 31 | 30 |
| | | DCP | — | 0.8 | — | 0.4 |
| | | Perhexa C-40 | — | — | 0.95 | 0.5 |
| | | Luperox 931XL | 1.58 | — | — | — |
| | | Zinc oxide | 5 | 5 | 5 | 5 |
| | | PBDS | 0.63 | 0.63 | 0.63 | 0.63 |
| | | Zinc octanoate | 5 | 5 | 5 | 5 |
| | Curing conditions | Heating temperature (° C.) | 130 | 160 | 139 | 139 |
| | | Heating time (min) | 20 | 20 | 20 | 20 |
| | Properties | Compression deformation amount (mm) | 3.98 | 3.86 | 3.87 | 3.87 |
| | | Coefficient of restitution difference | 0.005 | 0 | 0 | 0 |
| | Hardness (Shore C) | Center (Ho) | 49.0 | 47.0 | 46.1 | 46.6 |
| | | Point located 5 mm from center | 54.7 | 58.8 | 57.3 | 58.0 |
| | | Point located 10 mm from center | 60.6 | 63.8 | 62.4 | 63.1 |
| | | Point located 15 mm from center | 69.7 | 76.8 | 73.3 | 75.0 |
| | | Surface (Hs) | 75.7 | 84.3 | 78.7 | 81.5 |
| | | Hardness difference (Hs − Ho) | 26.8 | 37.3 | 32.6 | 35.0 |
| Evaluation for golf ball | | Compression deformation amount (mm) | 3.48 | 3.36 | 3.37 | 3.37 |
| | | Coefficient of restitution difference | 0.005 | 0 | 0 | 0 |

BR730: high cis-polybutadiene (cis-1,4-bond amount = 96 mass %, 1,2-vinyl bond amount = 1.3 mass %, Mooney viscosity $(ML_{1+4} (100° C.))$ = 55, Molecular weight distribution (Mw/Mn) = 3) available from JSR Corporation
ZN-DA90S: zinc acrylate (product with 10 mass % of zinc stearate coating) available from Nisshoku Techno Fine Chemical Co., Ltd.
Zinc oxide: "Ginrei R" available from Toho Zinc Co., Ltd.
PBDS: bis(pentabromophenyl) disulfide
Zinc octanoate: (purity: at least 99%) available from Mitsuwa Chemicals Co., Ltd.
DCP: "Percumyl (registered trademark) D (dicumyl peroxide)" (one-minute half-life temperature: 175° C.) available from NOF Corporation
Perhexa C-40: "Perhexa (registered trademark) C-40 (1,1-di(t-butylperoxy)cyclohexane)" (one-minute half-life temperature: 154° C.) available from NOF Corporation
Luperox 931XL: "Luperox (registered trademark) 931XL (1,1-di(1-methyl-1-phenylethylperoxy)cyclohexane) (in the formula (1), $R^1$ and $R^2$ are phenyl groups, $R^3$ to $R^{12}$ are hydrogen atoms, and the substituents represented by $R^1$ and $R^2$ have a bond dissociation energy of 474 KJ/mol)" (estimated one-minute half-life temperature: 14° C.) available from ARKEMA Yoshitomi Ltd.

(2) Production of Cover

Then, according to the formulation shown in Table 2, the cover materials were extruded with a twin-screw kneading extruder to prepare the cover composition in a pellet form. The extruding conditions were a screw diameter of 45 mm, a screw rotational speed of 200 rpm, and screw L/D=35, and the mixtures were heated to 150° C. to 230° C. at the die position of the extruder. The obtained cover composition was injection molded on the spherical core obtained as described above to produce the golf ball having a spherical core and a cover covering the core.

This application is based on Japanese patent application No. 2016-108458 filed on May 31, 2016, the content of which is hereby incorporated by reference.

The invention claimed is:
1. A golf ball having a spherical core and at least one cover layer covering the spherical core,
   wherein the spherical core is formed from a rubber composition containing:
   (a) a base rubber,

(b) an α,β-unsaturated carboxylic acid having 3 to 8 carbon atoms and/or a metal salt thereof as a co-crosslinking agent, and
(c) a crosslinking initiator,
provided that the rubber composition further contains (d) a metal compound if only (b) the α,β-unsaturated carboxylic acid having 3 to 8 carbon atoms is present as the co-crosslinking agent,
wherein (c) the crosslinking initiator includes a peroxy ketal represented by formula (1):

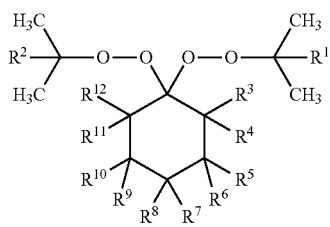

(1)

wherein in formula (1), $R^1$ and $R^2$ independently represent an aryl group, an aralkyl group, an alkylaryl group, an alkoxy group, an amino group or a hydroxyl group, $R^3$ to $R^{12}$ independently represent a hydrogen atom, an alkyl group having 4 to 6 carbon atoms, an aryl group, an aralkyl group or an alkylaryl group, and the substituents represented by $R^1$ and $R^2$ have a bond dissociation energy of 435 KJ/mol or more.

2. The golf ball according to claim 1, wherein the substituents represented by $R^1$ and $R^2$ have a bond dissociation energy of 450 KJ/mol or more.

3. The golf ball according to claim 1, wherein the substituents represented by $R^1$ and $R^2$ include a phenyl group or a naphthyl group.

4. The golf ball according to claim 1, wherein the spherical core has a hardness difference (Hs–Ho) of 0 or more in Shore C hardness between a surface hardness (Hs) thereof and a center hardness (Ho) thereof.

5. The golf ball according to claim 1, wherein the rubber composition contains the metal salt of the α,β-unsaturated carboxylic acid having 3 to 8 carbon atoms as (b) the co-crosslinking agent.

6. The golf ball according to claim 1, wherein the rubber composition further contains (e) an organic sulfur compound.

7. The golf ball according to claim 6, wherein (e) the organic sulfur compound is at least one compound selected from the group consisting of thiophenols, diphenyl disulfides, thionaphthols, thiuram disulfides, and metal salts thereof.

8. The golf ball according to claim 6, wherein the rubber composition contains (e) the organic sulfur compound in an amount ranging from 0.05 part by mass to 5.0 parts by mass with respect to 100 parts by mass of (a) the base rubber.

9. The golf ball according to claim 1, wherein the rubber composition contains (b) the α,β-unsaturated carboxylic acid having 3 to 8 carbon atoms and/or the metal salt thereof in an amount ranging from 15 parts by mass to 50 parts by mass with respect to 100 parts by mass of (a) the base rubber.

10. The golf ball according to claim 1, wherein the substituents represented by $R^1$ and $R^2$ have a bond dissociation energy of 1000 KJ/mol or less.

11. The golf ball according to claim 1, wherein the peroxy ketal represented by the formula (1) is at least one selected from compounds represented by the formulae (2) to (6):

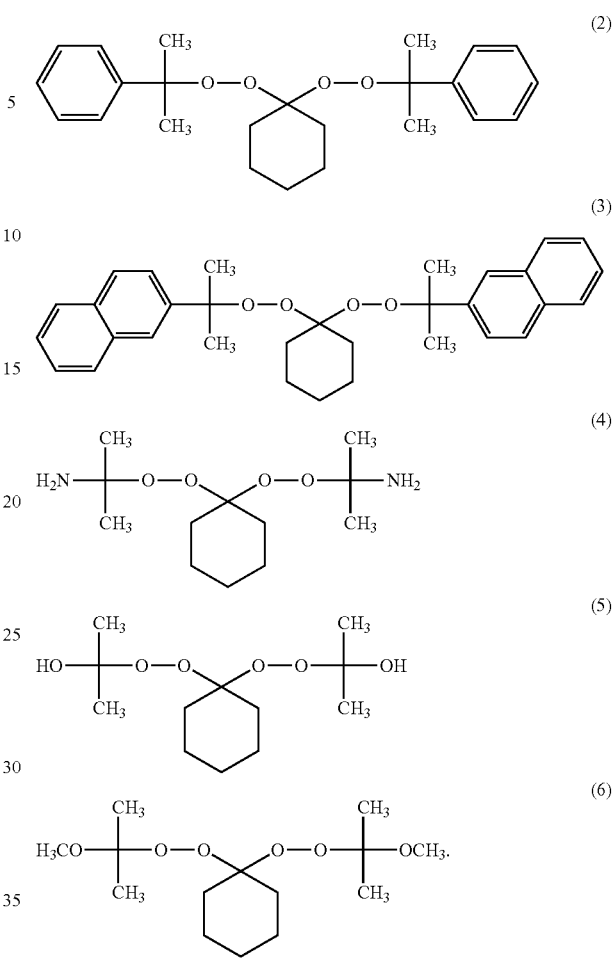

12. The golf ball according to claim 1, wherein an amount of the peroxy ketal represented by the formula (1) in an amount of (c) the crosslinking initiator is 50 mass % or more.

13. The golf ball according to claim 1, wherein (c) the crosslinking initiator consists of the peroxy ketal represented by the formula (1).

14. The golf ball according to claim 1, wherein the rubber composition further contains (f) a carboxylic acid and/or a salt thereof.

15. The golf ball according to claim 14, wherein (f) the carboxylic acid and/or the salt thereof is at least one selected from the group consisting of an aliphatic carboxylic acid, a salt of an aliphatic carboxylic acid, an aromatic carboxylic acid, and a salt of an aromatic carboxylic acid.

16. The golf ball according to claim 14, wherein the rubber composition contains (f) the carboxylic acid and/or the salt thereof in an amount ranging from 0.5 part by mass to 40 parts by mass with respect to 100 parts by mass of (a) the base rubber.

17. The golf ball according to claim 1, wherein the spherical core has a center hardness Ho ranging from 30 to 70 in Shore C hardness.

18. The golf ball according to claim 1, wherein the spherical core has a surface hardness Hs ranging from 65 to 100 in Shore C hardness.

19. The golf ball according to claim 1, wherein
the substituents represented by $R^1$ and $R^2$ have a bond dissociation energy of 450 KJ/mol or more, the substituents represented by $R^1$ and $R^2$ include a phenyl group or a naphthyl group, and the spherical core has a hardness difference (Hs−Ho) of 0 or more in Shore C hardness between a surface hardness (Hs) thereof and a center hardness (Ho) thereof.

20. The golf ball according to claim 1, wherein the rubber composition contains the metal salt of the α,β-unsaturated carboxylic acid having 3 to 8 carbon atoms as (b) the co-crosslinking agent in an amount ranging from 15 parts by mass to 50 parts by mass with respect to 100 parts by mass of (a) the base rubber, and the rubber composition further contains (e) an organic sulfur compound in an amount ranging from 0.05 part by mass to 5.0 parts by mass with respect to 100 parts by mass of (a) the base rubber, and (e) the organic sulfur compound is at least one compound selected from the group consisting of thiophenols, diphenyl disulfides, thionaphthols, thiuram disulfides, and metal salts thereof.

21. A golf ball having a spherical core and at least one cover layer covering the spherical core, wherein the spherical core is formed from a rubber composition containing:

(a) a base rubber, (b) an α,β-unsaturated carboxylic acid having 3 to 8 carbon atoms and/or a metal salt thereof as a co-crosslinking agent, and (c) a crosslinking initiator, provided that the rubber composition further contains (d) a metal compound if only (b) the α,β-unsaturated carboxylic acid having 3 to 8 carbon atoms is present as the co-crosslinking agent, wherein (c) the crosslinking initiator includes a peroxy ketal represented by formula (1):

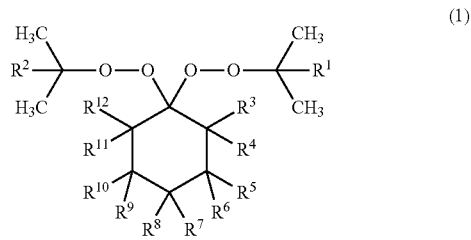

wherein in formula (1), $R^1$ and $R^2$ independently represent a naphthyl group, an anthryl group, a biphenyl group, a phenanthryl group, a fluorenyl group, an aralkyl group, a xylyl group, a mesityl group, an alkoxy group, an amino group or a hydroxyl group, $R^3$ to $R^{12}$ independently represent a hydrogen atom, an alkyl group, an aryl group, an aralkyl group or an alkylaryl group, and the substituents represented by $R^1$ and $R^2$ have a bond dissociation energy of 435 KJ/mol or more.

* * * * *